US007043727B2

(12) United States Patent
Bennett et al.

(10) Patent No.: US 7,043,727 B2
(45) Date of Patent: May 9, 2006

(54) METHOD AND SYSTEM FOR EFFICIENT DISTRIBUTION OF NETWORK EVENT DATA

(75) Inventors: Andrew Jonathan Bennett, London (GB); David Richard Franklin, London (GB); Kristian Jon Stewart, London (GB)

(73) Assignee: Micromuse Ltd., London (GB)

( * ) Notice: Subject to any disclaimer, the term of this patent is extended or adjusted under 35 U.S.C. 154(b) by 782 days.

(21) Appl. No.: 09/877,619

(22) Filed: Jun. 8, 2001

(65) Prior Publication Data
US 2003/0014462 A1    Jan. 16, 2003

(51) Int. Cl.
G06F 17/00 (2006.01)
(52) U.S. Cl. .................. 718/100; 709/223; 709/224
(58) Field of Classification Search ............. 709/219, 709/247, 223–224; 707/3; 718/100
See application file for complete search history.

(56) References Cited

U.S. PATENT DOCUMENTS

| | | |
|---|---|---|
| 3,855,456 A | 12/1974 | Summers et al. |
| 3,906,454 A | 9/1975 | Martin |
| 4,135,662 A | 1/1979 | Dlugos |
| 4,410,950 A | 10/1983 | Toyoda et al. |
| 4,438,494 A | 3/1984 | Budde et al. |
| 4,503,534 A | 3/1985 | Budde et al. |
| 4,503,535 A | 3/1985 | Budde et al. |
| 4,517,468 A | 5/1985 | Kemper et al. |
| 4,545,013 A | 10/1985 | Lyon et al. |
| 4,568,909 A | 2/1986 | Whynacht |
| 4,585,975 A | 4/1986 | Wimmer |
| 4,591,983 A | 5/1986 | Bennett et al. |
| 4,622,545 A | 11/1986 | Atkinson |
| 4,648,044 A | 3/1987 | Hardy et al. |
| 4,727,545 A | 2/1988 | Glackemeyer et al. |
| 4,817,092 A | 3/1989 | Denny |

(Continued)

FOREIGN PATENT DOCUMENTS

EP    0 209 795    1/1987

(Continued)

OTHER PUBLICATIONS

Subramanian, Mani, Network Management: Principles and Practice, Addison Wesley Longman, 2000.

(Continued)

Primary Examiner—William Thomson
Assistant Examiner—Qing-Yuan Wu
(74) Attorney, Agent, or Firm—Brown Raysman Millstein Felder & Steiner LLP

(57) ABSTRACT

Described herein are methods and systems for preparing to efficiently distribute data to be extracted from a data store to clients and for distributing such prepared data to the clients. The methods and system have particular utility in the context of a network monitoring system which captures and stores network event data and makes the event data available to clients according to any desired view or summary. One method for preparing the data involves storing as primary requests one or more client requests for data to be extracted from the event database. Additional client requests for event are each compared to the stored primary requests to determine whether each additional request matches a stored primary request in accordance with a given criterion, such as a filter or summary formula. If the additional request matches a stored primary request, the additional client request is associated with the matching primary request. If the additional request does not match a stored primary request, the additional request is stored as a new primary request. As a result of this method, client requests which match one another can be processed at once and distributed to all clients registering the request.

22 Claims, 6 Drawing Sheets

U.S. PATENT DOCUMENTS

| | | |
|---|---|---|
| 4,823,345 A | 4/1989 | Daniel et al. |
| 4,866,712 A | 9/1989 | Chao |
| 4,881,230 A | 11/1989 | Clark et al. |
| 4,914,657 A | 4/1990 | Walter et al. |
| 4,932,026 A | 6/1990 | Dev et al. |
| 4,935,876 A | 6/1990 | Hanatsuka |
| 5,107,497 A | 4/1992 | Lirov et al. |
| 5,109,486 A | 4/1992 | Seymour |
| 5,123,017 A | 6/1992 | Simpkins et al. |
| 5,125,091 A | 6/1992 | Staas, Jr. et al. |
| 5,133,075 A | 7/1992 | Risch |
| 5,159,685 A | 10/1992 | Kung |
| 5,179,556 A | 1/1993 | Turner |
| 5,204,955 A | 4/1993 | Kagei et al. |
| 5,214,653 A | 5/1993 | Elliott, Jr. et al. |
| 5,247,517 A | 9/1993 | Rose et al. |
| 5,261,044 A | 11/1993 | Dev et al. |
| 5,293,629 A | 3/1994 | Conley et al. |
| 5,295,244 A | 3/1994 | Dev et al. |
| 5,309,448 A | 5/1994 | Bouloutas et al. |
| 5,321,837 A | 6/1994 | Daniel et al. |
| 5,375,070 A | 12/1994 | Hershey et al. |
| 5,432,934 A | 7/1995 | Levin et al. |
| 5,436,909 A | 7/1995 | Dev et al. |
| 5,483,637 A | 1/1996 | Winokur et al. |
| 5,485,455 A | 1/1996 | Dobbins et al. |
| 5,491,694 A | 2/1996 | Oliver et al. |
| 5,495,470 A | 2/1996 | Tyburski et al. |
| 5,504,887 A | 4/1996 | Malhotra et al. ........... 395/600 |
| 5,504,921 A | 4/1996 | Dev et al. |
| 5,521,910 A | 5/1996 | Matthews |
| 5,528,516 A | 6/1996 | Yemini et al. |
| 5,559,955 A | 9/1996 | Dev et al. |
| 5,590,120 A | 12/1996 | Vaishnavi et al. |
| 5,627,819 A | 5/1997 | Dev et al. |
| 5,646,864 A | 7/1997 | Whitney ................. 364/514 B |
| 5,649,103 A | 7/1997 | Datta et al. |
| 5,664,220 A | 9/1997 | Itoh et al. .................... 395/826 |
| 5,666,481 A | 9/1997 | Lewis ................... 395/182.02 |
| 5,668,987 A * | 9/1997 | Schneider ...................... 707/3 |
| 5,673,264 A | 9/1997 | Hamaguchi ................. 370/397 |
| 5,675,741 A | 10/1997 | Aggarwal et al. |
| 5,687,290 A | 11/1997 | Lewis |
| 5,696,486 A | 12/1997 | Poliquin et al. |
| 5,706,436 A | 1/1998 | Lewis et al. |
| 5,722,427 A | 3/1998 | Wakil et al. |
| 5,727,157 A | 3/1998 | Orr et al. |
| 5,727,196 A | 3/1998 | Strauss, Jr. et al. ......... 395/602 |
| 5,734,642 A | 3/1998 | Vaishnavi et al. |
| 5,748,781 A | 5/1998 | Datta et al. |
| 5,751,933 A | 5/1998 | Dev et al. |
| 5,751,965 A | 5/1998 | Mayo et al. |
| 5,754,532 A | 5/1998 | Dev et al. |
| 5,764,955 A | 6/1998 | Doolan |
| 5,768,501 A | 6/1998 | Lewis |
| 5,777,549 A | 7/1998 | Arrowsmith et al. |
| 5,790,546 A | 8/1998 | Dobbins et al. |
| 5,791,694 A | 8/1998 | Fahl et al. |
| 5,793,362 A | 8/1998 | Matthew et al. |
| 5,812,750 A | 9/1998 | Dev et al. |
| 5,822,305 A | 10/1998 | Vaishnavi et al. |
| 5,832,503 A | 11/1998 | Malik et al. |
| 5,872,911 A | 2/1999 | Berg ..................... 395/183.19 |
| 5,872,928 A | 2/1999 | Lewis et al. |
| 5,889,953 A | 3/1999 | Thebaut et al. |
| 5,907,696 A | 5/1999 | Stilwell et al. |
| 5,940,376 A | 8/1999 | Yanacek et al. |
| 5,956,488 A * | 9/1999 | Suzuki ....................... 709/219 |
| 5,970,984 A | 10/1999 | Wakil et al. |
| 5,980,984 A | 11/1999 | Modera et al. |
| 5,987,442 A | 11/1999 | Lewis et al. |
| 6,000,045 A | 12/1999 | Lewis |
| 6,003,090 A | 12/1999 | Puranik et al. |
| 6,006,016 A | 12/1999 | Faigon et al. ........... 395/185.01 |
| 6,014,697 A | 1/2000 | Lewis et al. |
| 6,026,442 A | 2/2000 | Lewis et al. |
| 6,041,383 A | 3/2000 | Jeffords et al. |
| 6,047,126 A | 4/2000 | Imai .......................... 395/710 |
| 6,049,828 A | 4/2000 | Dev et al. |
| 6,057,757 A | 5/2000 | Arrowsmith et al. |
| 6,064,304 A | 5/2000 | Arrowsmith et al. |
| 6,064,986 A | 5/2000 | Edelman |
| 6,064,996 A | 5/2000 | Yamaguchi et al. |
| 6,084,858 A | 7/2000 | Matthews et al. |
| 6,115,362 A | 9/2000 | Bosa et al. |
| 6,131,112 A | 10/2000 | Lewis et al. |
| 6,138,122 A | 10/2000 | Smith et al. |
| 6,141,720 A | 10/2000 | Jeffords et al. |
| 6,170,013 B1 | 1/2001 | Murata ....................... 709/229 |
| 6,199,172 B1 | 3/2001 | Dube et al. |
| 6,205,563 B1 | 3/2001 | Lewis |
| 6,209,033 B1 | 3/2001 | Datta et al. |
| 6,216,168 B1 | 4/2001 | Dev et al. |
| 6,233,623 B1 | 5/2001 | Jeffords et al. |
| 6,243,747 B1 | 6/2001 | Lewis et al. |
| 6,255,943 B1 | 7/2001 | Lewis et al. |
| 6,324,530 B1 | 11/2001 | Yamaguchi et al. |
| 6,324,590 B1 | 11/2001 | Jeffords et al. |
| 6,336,138 B1 | 1/2002 | Caswell et al. |
| 6,349,306 B1 | 2/2002 | Malik et al. |
| 6,373,383 B1 | 4/2002 | Arrowsmith et al. |
| 6,374,293 B1 | 4/2002 | Dev et al. |
| 6,381,639 B1 | 4/2002 | Thebaut et al. |
| 6,392,667 B1 | 5/2002 | McKinnon et al. |
| 6,421,719 B1 | 7/2002 | Lewis et al. |
| 6,430,712 B1 | 8/2002 | Lewis |
| 6,437,804 B1 | 8/2002 | Ibe et al. |
| 6,502,079 B1 | 12/2002 | Ball et al. |
| 6,510,478 B1 | 1/2003 | Jeffords et al. |
| 6,603,396 B1 | 8/2003 | Lewis et al. |
| 6,651,062 B1 | 11/2003 | Ghannam et al. |
| 6,785,675 B1 * | 8/2004 | Graves et al. ................. 707/4 |
| 6,785,722 B1 * | 8/2004 | Vuong et al. ................ 709/223 |
| 2001/0013107 A1 | 8/2001 | Lewis |
| 2001/0042139 A1 | 11/2001 | Jeffords et al. |
| 2001/0047409 A1 | 11/2001 | Datta et al. |
| 2001/0047430 A1 | 11/2001 | Dev et al. |
| 2001/0052085 A1 | 12/2001 | Dube et al. |
| 2002/0032760 A1 | 3/2002 | Matthews et al. |
| 2002/0050926 A1 | 5/2002 | Lewis et al. |
| 2002/0075882 A1 | 6/2002 | Donis et al. |
| 2002/0184528 A1 | 12/2002 | Shevenell et al. |
| 2002/0188584 A1 | 12/2002 | Ghannam et al. |
| 2003/0079041 A1 * | 4/2003 | Parrella et al. ............. 709/247 |
| 2003/0110396 A1 | 6/2003 | Lewis et al. |

FOREIGN PATENT DOCUMENTS

| | | |
|---|---|---|
| EP | 0 319 998 B1 | 6/1989 |
| EP | 0 338 561 B1 | 10/1989 |
| EP | 0 342 547 B1 | 11/1989 |
| EP | 0 616 289 | 9/1994 |
| EP | 0 686 329 B1 | 12/1995 |
| WO | WO 89/07377 | 8/1989 |
| WO | WO 93/00632 | 1/1993 |
| WO | WO 95/20297 | 7/1995 |
| WO | WO 96/09707 | 3/1996 |
| WO | WO 97/16906 | 5/1997 |
| WO | WO 97/29570 | 8/1997 |
| WO | WO 97/37477 | 10/1997 |
| WO | WO 97/44937 | 11/1997 |
| WO | WO 98/42109 | 9/1998 |
| WO | WO 98/44682 | 10/1998 |
| WO | WO 98/52322 | 11/1998 |

| | | |
|---|---|---|
| WO | WO 99/27682 | 6/1999 |
| WO | WO 00/13112 | 3/2000 |
| WO | WO 00/72183 | 11/2000 |
| WO | WO 01/86380 | 11/2001 |
| WO | WO 01/86443 | 11/2001 |
| WO | WO 01/86444 | 11/2001 |
| WO | WO 01/86775 | 11/2001 |
| WO | WO 01/86844 | 11/2001 |
| WO | WO 02/06971 | 1/2002 |
| WO | WO 02/06972 | 1/2002 |
| WO | WO 02/06973 | 1/2002 |

OTHER PUBLICATIONS

Lewis, Lundy, Service Level Management for Enterprise Networks, Artech House, 1999.

Integrated Network Management V: Integrated Management in a Virtual World, Proceedings of the Fifth IFIP/IEEE International Symposium on Integrated Network Management, San Diego, California, May 12-16, 1997, Lazar A. et al, eds., Chapman & Hall, 1997.

Stevenson Douglas W., Network Management: What it is and what it isn't, Apr. 1995, http://www.sce.carleton.ca/netmanage/NetMngmnt/NetMngmnt.html (visited Aug. 30, 2004).

Network and Distributed Systems Management, Morris Sloman, Ed., Addison-Wesley, 1994.

RFC 1158—Mangement Information Base for network management of TCP/IP-based internets: MIB-II, Network Working Group, M. Rose, Ed., May 1990, http://www.faqs.org/rfcs/rfc1158.html (visited Aug. 30, 2004).

RFC 1157—Simple Network Management Protocol (SNMP), Network Working Group, J. Case et al., Eds., May 1990, http://www.faqs.org/rfcs/rfc1157.html (visited Aug. 30, 2004).

RFC 1156—Management Information Base for network management of TCP/IP-based internets, Network Working Group, K. McCloghrie and M. Rose, Eds., May 1990, http://www.faqs.org/rfcs/rfc1155.html (visited Aug. 30, 2004).

RFC 1155—Structure and identification of management information for TCP/IP-based internets, Network Working Group, M. Rose and K. McCloghrie, Eds., May 1990, http://www.faqs.org/rfcs/rfc1155.html (visited Aug. 30, 2004).

ISO/IEC 10164-1: 1993, Information technology—Open Systems Interconnection—Systems Management: Object Management Function.

ISO/IEC 10164-2:1993, Information technology—Open Systems Interconnection—Systems Management: State Management Function.

ISO/IEC 10164-4:1992, Information technology—Open Systems Interconnection—Systems management: Alarm reporting function.

ISO/IEC 10164-5:1993, Information technology—Open Systems Interconnection—Systems management: Event Report Management Function.

ISO/IEC 10165-1:1993, Information technology—Open Systems Interconnection—Management: Information Services—Structure of management information: Management Information Model.

ISO/IEC 9595:1998, Information technology—Open Systems Interconnection—Common management information service.

ISO/IEC 9596-2:1993, Information technology—Open Systems Interconnection—Common management information protocol: Protocol Implementation Conformance Statement (PICS) proforma.

ISO/IEC 7498-4:1989, Information processing systems—Open Systems Interconnection—Basic Reference Model—Part 4: Management framework.

Gilbert R., et al., CNMGRAF—Graphic Presentation Services for Network Management, ACM 0-89791-164 (1985).

M. Gargano, et al., A Logical Data Model for Integrated Geographical Databases, IEEE (1990).

Micromuse's Netcool/Omnibus, A Cool MOM Makes It Easy, Data Communications, Jan. 1995.

* cited by examiner

METHOD AND SYSTEM FOR EFFICIENT DISTRIBUTION OF NETWORK EVENT DATA

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates generally to network monitoring systems. More particularly, the present invention relates to methods and systems for efficiently distributing data relating to events occurring on a network to a large number of users requesting the data.

Maintaining the proper operation of services provided over a network is usually an important but difficult task. Service administrators are often called upon to react to a service failure by identifying the problem that caused the failure and then taking steps to correct the problem. The expense of service downtime, the limited supply of network engineers, and the competitive nature of today's marketplace have forced service providers to rely more and more heavily of software tools to keep their networks operating at peak efficiency and to deliver contracted service levels to an expanding customer base. Accordingly, it has become vital that these software tools be able to manage and monitor a network as efficiently as possible.

A number of tools are available to assist administrators in completing these tasks. One example is the NETCOOL® suite of applications available from Micromuse Inc. which allows network administrators to monitor activity on networks such as wired and wireless voice communication networks, intranets, wide area networks, or the Internet. The NETCOOL® suite includes probes and monitors which log and collect network event data, including network occurrences such as alerts, alarms, or other faults, and store the event data in a database on a server. The system then reports the event data to network administrators in graphical and text based formats in accordance with particular requests made by the administrators. Administrators are thus able to observe desired network events on a real-time basis and respond to them more quickly. The NETCOOL® software allows administrators to request event data summarized according to a desired metric or formula, and further allows administrators to select filters in order to custom design their own service views and service reports.

In a demanding environment, there are many tens or even hundreds of clients viewing essentially the same filtered or summarized event data. The work required to derive such data for a single user is thus replicated for all users. If there are N users, each viewing M items of metric or summary data, the work done by the database is of the order of N*M. This limits the number of clients who can be connected to a single database and the frequency with which such filtered or summarized data can be provided.

There is therefore a need for improved and more efficient techniques for reducing the amount of work that needs to be performed by the database in order to distribute event summary data to a large number of administrator clients.

BRIEF SUMMARY OF THE INVENTION

It is an object of the present invention to provide improved and more efficient techniques for distributing network event data to a large number of clients.

The above and other objects are achieved by a method for preparing to efficiently distribute data to be extracted from a data store to a plurality of clients and a method for distributing such prepared data to the clients. One method for preparing the data involves storing as primary requests one or more client requests for data to be extracted from the data store. For an additional client request for data to be extracted from the data store, the additional request is compared to the stored primary requests to determine whether the additional request matches a stored primary request in accordance with a given criterion. If the additional request matches a stored primary request, the additional client request is stored as a secondary request associated with the matching primary request. If the additional request does not match a stored primary request, the additional request is stored as an additional primary request. The matching client requests may come from or relate to different clients who are to receive the requested data. As a result of this method, client requests which match one another can be processed at once and distributed to all clients registering the request.

In some embodiments, the client requests each contain a filter for extracting a subset of data from the data store. The additional request is then compared to the primary requests by comparing the filter in the additional request to the stored primary request filters to determine whether the additional request filter matches any stored primary request filter. Alternatively or additionally, some or all of the client requests may contain a request for summary data to be extracted from the data store and processed in accordance with a metric or formula. The additional request may then be alternatively or additionally compared to the stored primary requests by comparing the additional request metric to the stored primary request metrics to determine whether the additional request metric matches any stored primary request metric.

One method for distributing data extracted from a data store to a plurality of clients involves storing a set of client requests received from a plurality of clients, the set comprising a primary client request to provide data to a first client in association with one or more secondary client requests to provide data to one or more second clients different than the first client, the secondary client requests each matching the primary client request in accordance with a given criterion. A plurality of such sets may be stored to accommodate a plurality of different criteria. The method further involves extracting data from the data store in accordance with the primary client request in each set and distributing the extracted data to the first client requesting the primary data request and to the second client or clients requesting the secondary data request.

In some embodiments, the primary and secondary client requests each contain a filter for extracting a subset of data from the data store, and the set is identified through the filter. The filter is further used to extract the data from the data store. In addition, at least one of the client requests in the set may contain a metric for summarizing data extracted from the data store, and the metric is used in summarizing the extracted data. The processed, summarized data is then distributed to any first or second client whose client request contains the metric.

In some embodiments, the data is extracted from the data store and distributed to clients repeatedly at a first time interval or frequency. This embodiment applies, for example, when the data store is regularly updated with new data that the clients would want or need to be aware of. The length of time required to extract and distribute data to all first and second clients is measured or computed. If the determined time length exceeds a threshold, the first time interval or frequency is increased, thus resulting in less frequent updating of clients.

Some of the above and other objects of the present invention are also achieved by a system for efficient distribution of network event data. The system includes a data store such as a database containing data relating to events occurring on the network and a library for storing client requests for data from the data store. The client requests identify a plurality of clients and are ordered as one or more sets of client requests, each set containing one or more client requests matching a given criterion. The system further contains a notification system for distributing data extracted from the data store in accordance with the client requests to the plurality of clients.

The methods and systems described herein are particularly useful in the context of a network management system which has a database storing regularly occurring events monitored or collected from the network. As explained above, a large network is monitored by many client administrators and produces an enormous amount of event data. To be effective, the client administrators need their data to be as up-to-date as possible, and thus need frequent updates on network events. In addition, the administrators also need to have this data filtered and summarized to suit their needs, and provide a number of persistent requests to that end. Given the large amount of data in the event database, these requirements present processing and bandwidth issues which are difficult to overcome. The methods and systems described above and further below for supporting very efficient distribution of the event data from the database go a long way towards providing that much needed solution.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

In accordance with the invention, methods and systems are described herein, with reference to the Figures, for providing efficient delivery of data from a database to a number of clients. In particular, the description herein focuses on a network monitoring system in which data is captured relating to events such as faults or alarms occurring on a computer network and is distributed to a number of administrator clients responsible for monitoring the network and preventing or correcting such faults.

Figure 1:
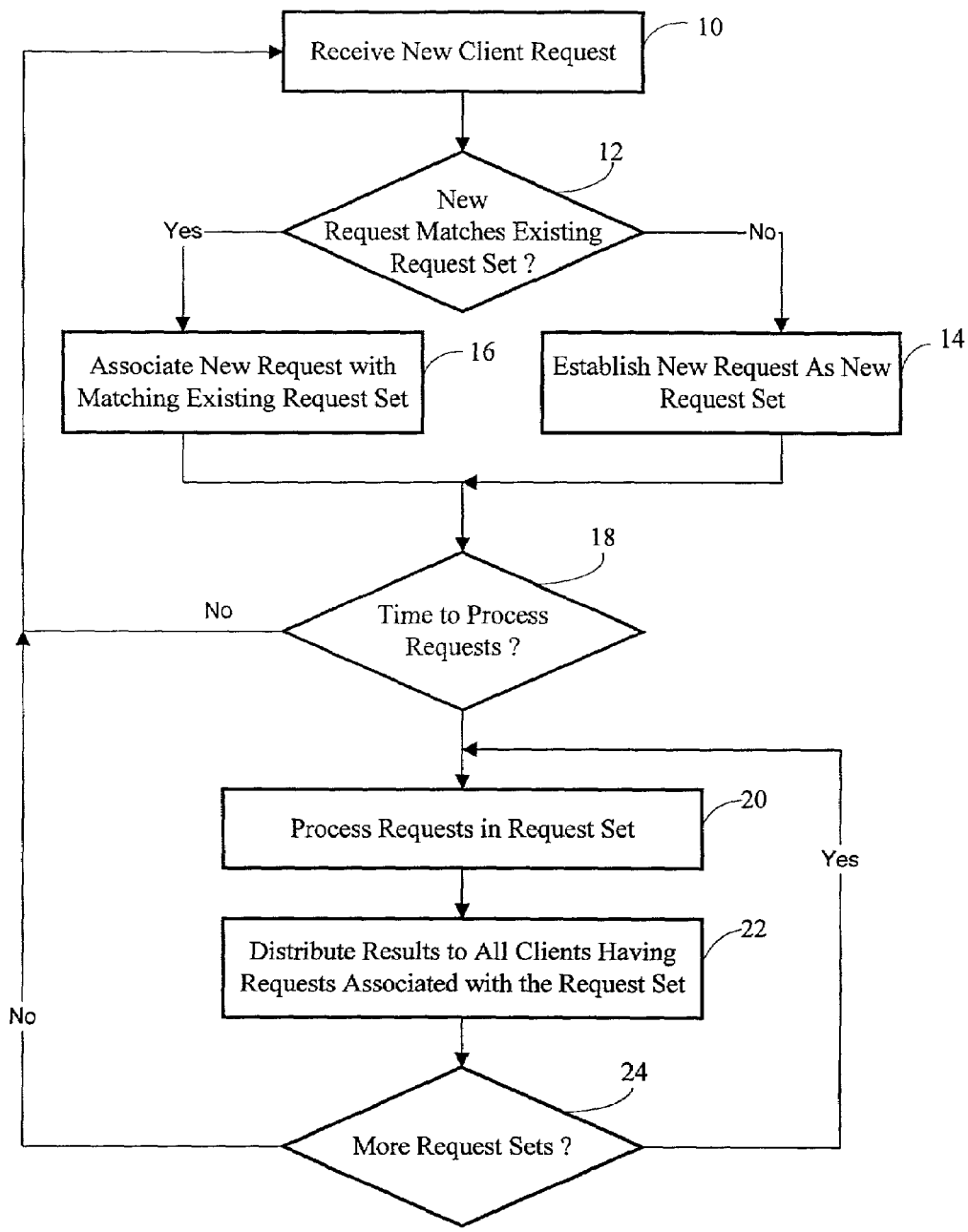
FIG. 1 is a flow chart showing a process of distributing data in accordance with one embodiment of the present invention.

Referring then to FIG. 1, an overview of a process of distributing data in accordance with the invention involves the receipt of a new client request, step 10. The new request is compared to stored existing request sets, if any, step 12. This comparison may be done on the basis of any desired criterion, such as matching filters or metrics as described further herein, with the ultimate goal being to reduce or eliminate the need for redundant processing of similar requests. If no matching request is found, the current request is established or registered as a new request set, step 14, which is then stored and made available for comparison to future client requests. If a request set is found which matches the current request, then the current request is associated with the matching existing request set, step 16. This association may be done by, for example, inserting an identifier such as an address for the client making the request or to whom the data is to be sent in a file for the set. Alternatively, any other appropriate mechanism may be used to implement this data association, such as pointers, object instances, or other mechanisms known to those of skill in the art.

At a time for processing requests, step 18, the request in each request set is processed, step 20, by, for example, querying for the requested data from a database or cache and processing it in any fashion specified in the request. As described further below, the processing of requests may be performed in parallel with or as a concurrent process interleaved with the processing of new client requests. For example, one or more request sets may be processed and distributed to clients, the process may then return to receiving and processing new requests, and then other request sets may be distributed. The results of each processed request are distributed to all clients having requests associated with the processed request, step 22. If there are any more request sets to be processed, step 24, the processing and distribution is repeated. When all request sets have been processed, or in between the processing of each request set, new client requests may be received and processed.

Figure 2:
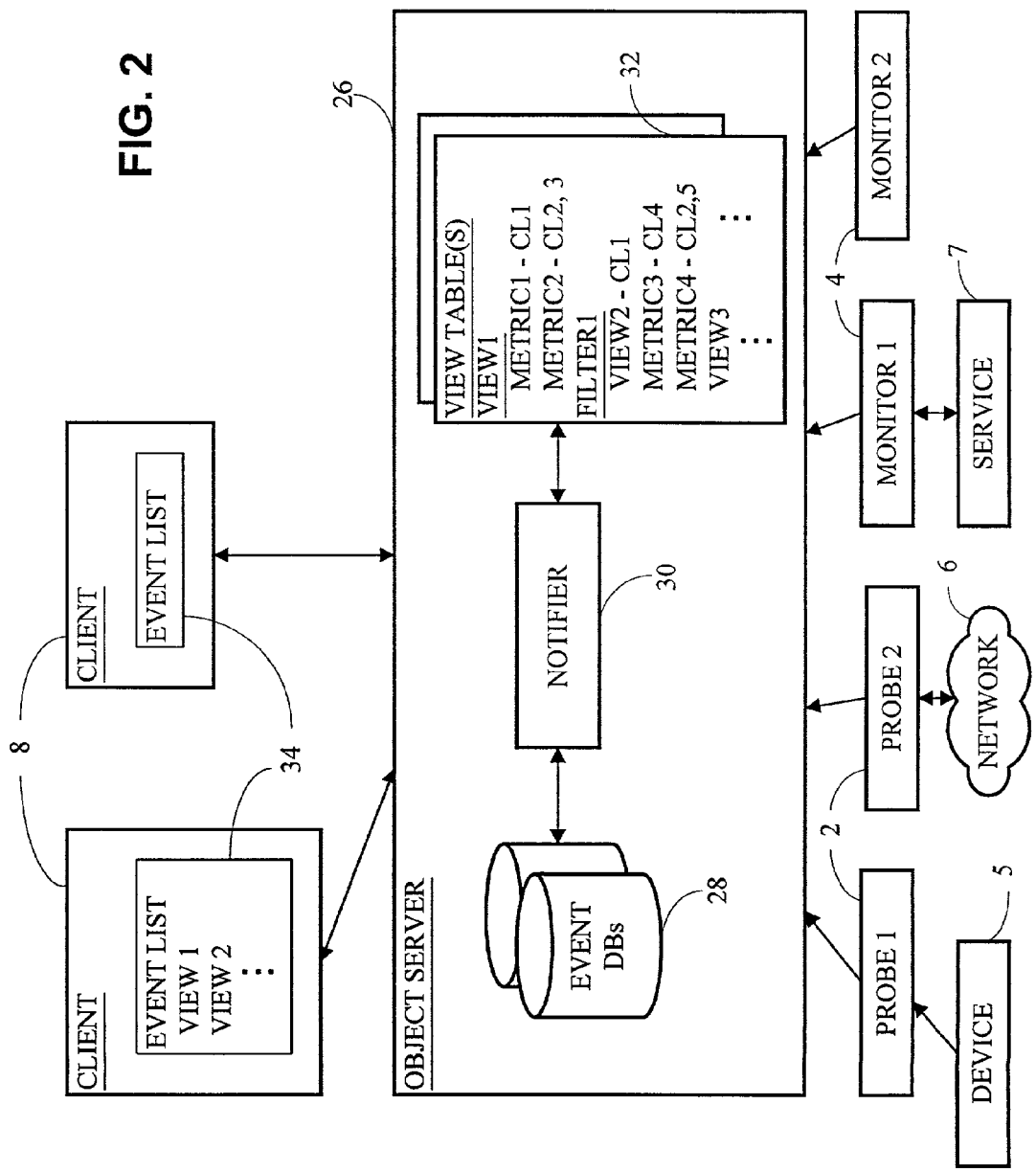
FIG. 2 is a block diagram showing functional components of a distribution system including an object server and notifier component in accordance with one embodiment of the present invention.

Embodiments of this process may be used in a variety of data distribution systems. However, a version of this process is particularly useful in a network monitoring system where clients subscribe to updates regarding events occurring in a large network and need to view the updated data with great frequency. With reference to FIG. 2, then, one preferred embodiment of a network monitoring system in accordance with the present invention includes an object server 26 which receives event data from a number of probes 2 and monitors 4, stores the event data in one or more event databases 28, and provides the event data to a number of clients 8 which issue requests for the data. In one embodiment, the event databases 28 in the object server 26 are relational event databases 28 such as the Object Server database available as part of the NETCOOL®/Omnibus system available from Micromuse Inc. Alternatively, the event database 28 may be any other suitable type of data store, such as an object-oriented database, flat file, etc. The event database 28 is a memory resident database, which is periodically dumped to file in case of failure. Events come in from probes 2 and monitors 4 in the form of SQL inserts. Clients 8 also access the database using SQL.

The probes 2 are portions of code that collect events from network management data sources 6, APIs, databases, network devices 5, log files, and other utilities. Monitors 4 are software applications that simulate network users to determine response times and availability of services 7 such as on a network. Other components may be used to collect and report on events occurring in the network or related devices or services.

The network management system monitors and reports on activity on a computer, telecommunications, or other type of network. In this context, clients 8 are typically administrators who make requests for event data which they need to monitor on a regular basis. Clients may elect to see all event activity on the network. More typically for larger networks, clients will only want to see event data occurring on particular parts of the network for which they are responsible or which may affect their portion of the network. In addition, clients may only want to see summaries of their relevant part of the event data, such as event counts, sums, averages, minimums, maximums, or other distributions of event data. Clients input the various requests into an event list 34, with each request representing and being sometimes referred to herein as a particular view on the data.

Event data is stored in the event database 28 of one embodiment in a number of rows and columns, with each row representing an event and the columns storing fields of data relating to the event, e.g., location, type, time, severity, etc. As used herein, then, a view is generally a mechanism for selecting columns from the database and may also optionally include a filter. A filter is generally a mechanism for excluding rows of data in the database based on column values. Views may therefore be based on filters. Filters may also be based on other filters and other views. A metric view is generally a type of view which provides summary information on the number of rows in a view rather than the actual data, and usually requires some arithmetic processing on the number of rows.

These client requests or views are persistent and are delivered according to a publish/subscribe model. That is, because network events occur regularly, the data in the event database 28 changes frequently and clients must be informed promptly of the updates in accordance with their specified requests to be able to make proper use of the data. The object server 26 processes the standing requests at a set frequency, e.g., every five or ten seconds, and delivers the results to the clients in the form of a stream or event data which is new or updated since the requests were last processed. The default or initial frequency for processing standing requests may be preset to any desired time frequency in any desired time units, e.g., seconds or portions thereof, minutes, hours, etc., and in any desired amount.

In accordance with the invention, a notification program or notifier 30 is provided which manages the client requests for data from the object server 26 to efficiently distribute the responses to the client requests. The notification program 30 may be part of the object server 26 as shown or may be a separate, standalone component of the system. In accordance with processes described in greater detail below, the notification program 30 manages the various client requests in a view list or table 32 having a number of request sets. Each request set relates to a specific type of view or data filter and may include a number of metrics or formulas which summarize data in the object server 26 and which are requested to be processed by or for clients 8. A process for organizing or ordering views, filters and metrics is described below with reference to FIG. 4.

Thus, when a client 8 elects a metric view in its event list 34, the notifier 30 registers interest in that metric view with the view table 32 in the object server 26. If another client elects to view the same metric view, notifier 30 also registers that other client's interest in the summary data in the view table 32.

When the notifier 30 receives a registration request from a client 8, it scans its list of existing registrations. If, as in this example, an identical registration already exists, the second registration is associated with the first. The first registration of particular summary data may be referred to as a "primary" registration or request, whereas subsequent registrations of identical summary data may be referred to as "secondary" registrations or requests. The notifier 30 periodically scans its list of primary registrations, and for each it calculates the summary data, and sends the results to all clients that have registered interest in that data. As a result, this notification program 30 and view list library 32 optimizes the evaluation of summary data. Specifically, assuming that each client requests views of the same M metrics, the work done by the object server 26 is of the order of M, rather than M*(number of clients).

As can be seen, the notifier 30 manages several ongoing processes, including the processes of registering new client views and keeping the sets of views in proper order and of processing event data updates to clients which request them. In one embodiment, the notifier 30 employs several thread pools to manage these ongoing, concurrent processes, including, for example, threads to process new event data coming into the event database 28 and to place the event data into output stream caches, to process new views received from clients and manage the data structures in the view tables 32, and to manage the flow of output streams with cached updated event data to clients. One advantage of using two or more thread pools is that the notifier 30 can output data without locking up the database. Where it does lock the database, it uses read locks which can be held by multiple threads. This improves the overall scalability and efficiency of the object server 26.

Each client's event list needs to have associated views updated at the same time, e.g., a view and the equivalent metric view must be updated at the same time. Otherwise, the event list user will see inconstant data being displayed. Similarly, if the view is the same except for the order in which the columns are displayed then they must both be updated at the same time. The notifier 30 therefore keeps track of which views and metric views should be linked in this way, and sends out the appropriate updates for all of these at approximately the same time.

When a client subscribes to a view, a check is made to see if another subscription already exists to this view (or an identical view with a different name). If it does, then the client is returned the same stream and data is only output once on that stream. Both clients can then listen or subscribe to this stream and pick up the same data. As views and streams are created and destroyed by clients, the notifier 30 maintains the data structures needed to perform this de-duplication of output data in the view tables 32. If a view is destroyed, the associated streams are destroyed. If a client disconnects, its streams are removed unless they are still used by other clients. If no more clients are subscribing to a stream then it is deleted.

Figure 3:
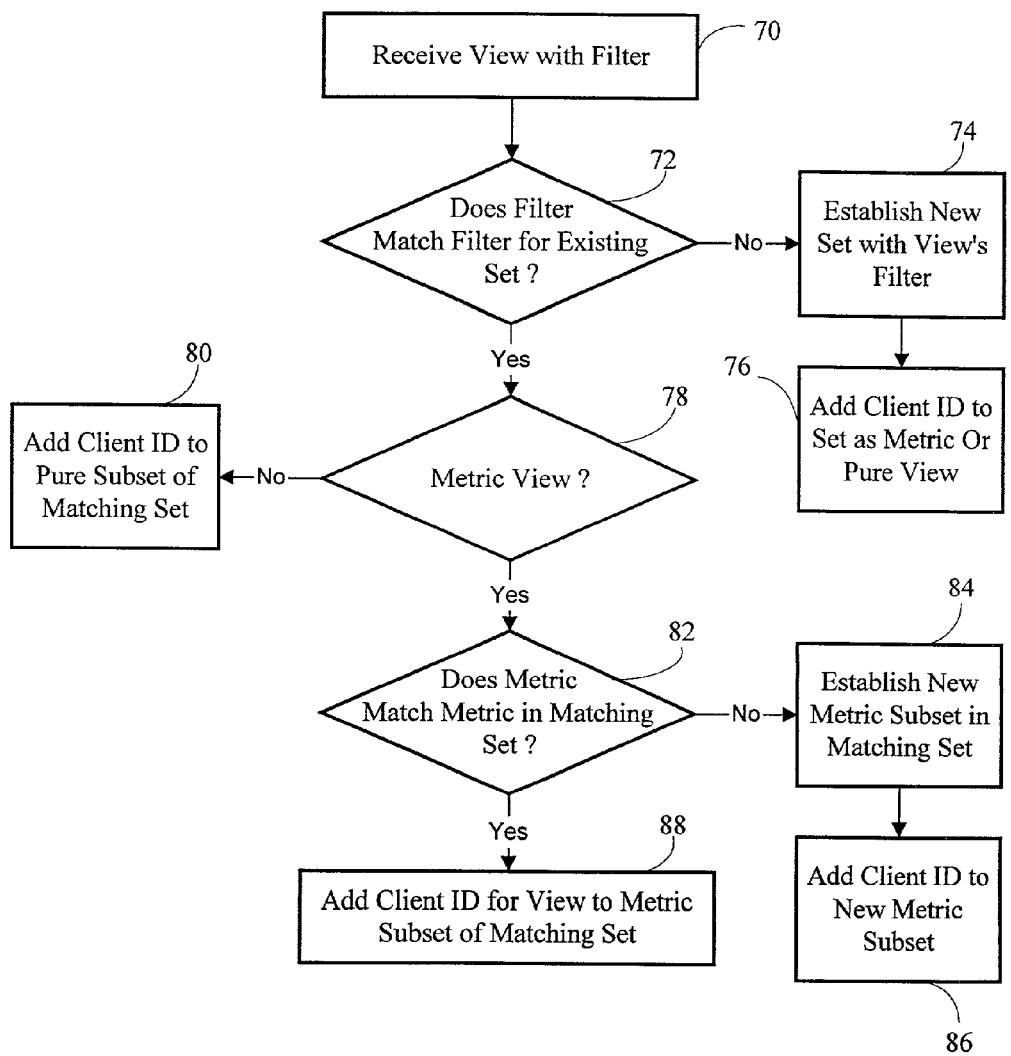
FIG. 3 is a flow chart showing a process of preparing requests as ordered sets of client views in accordance with one embodiment of the present invention.
Figure 4:
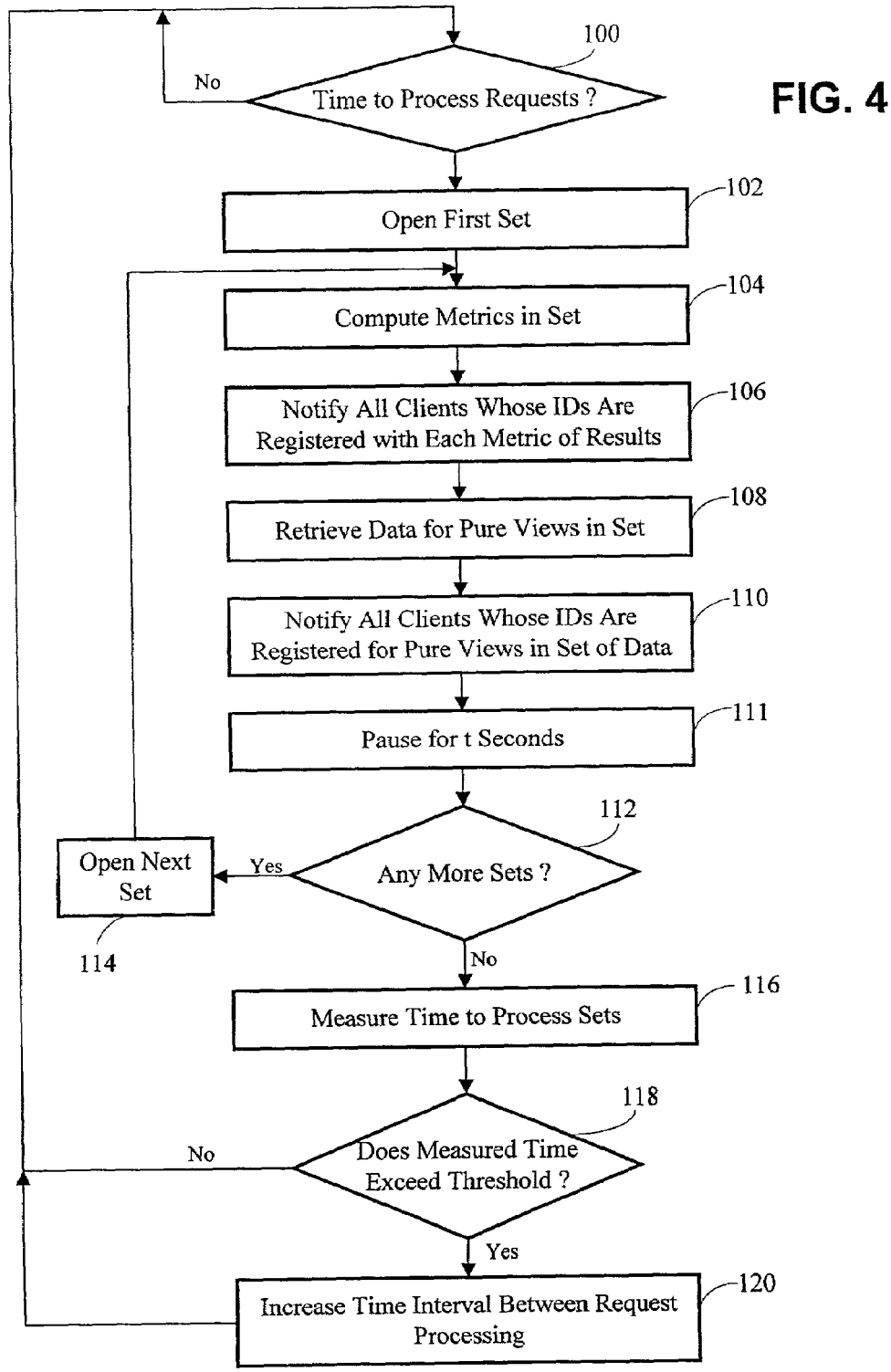
FIG. 4 is a flow chart showing a process of distributing data in accordance with one embodiment of the present invention.

FIGS. 3 and 4 show particular embodiments of processes for preparing to efficiently distribute data by ordering it into request sets and for distributing such ordered data to clients, respectively. These embodiments rely on the creation and management of certain sets for different types of requests or views available to clients—pure views and metric views. A pure view results from the application of a filter to all rows of a table, and a metric view is, as explained above, a formula for producing summary data of a pure view. Pure views typically result in raw data taken from the filtered rows, and metric views typically result in a small number of integers. In this regard, it is understood that a row is generally an ordered array of data values, a table is generally a set of identically typed rows, and a filter is generally an expression that, when applied to a row, is either true or false.

As will be understood, the goals of the process in FIG. 3 is to associate the set of metric views having the same filter with each other and to associate the set of pure views with a particular filter with the set of metric views with the same filter. The goal of the process in FIG. 4 is to distribute metric view and pure view data to clients so as to evenly distribute the load. The process in FIG. 3 takes a set of metric view and pure view definitions and produces an ordered set of pure view and metric view definitions, and the process of FIG. 4 takes the ordered set so produced and produces in turn a set of output data streams carrying metric view and pure view data.

Referring then to FIG. 3, each view is received with its filter, step 70, and the object server 26 checks whether the filter matches the filter for any existing set, step 72. In this regard, it may be helpful to represent a set of tuples, S, identified by a unique filter f. Each member of S, $S_f$ is a tuple<m, p>. Tuple member m is a set of metric view definitions related to the filter, and tuple member p is a set of pure view definitions with the filter. The set S is initially empty. If no set $S_f$ is found having a filter f matching the view under consideration, a new set is established for that filter, step 74. The ID of the client submitting the view is added to either the metric view set m or pure view set p for the filter, depending upon the nature of the view, step 76.

If a set having the filter is found, then, if the current view is not a metric view, i.e., is a pure view, step 78, the client ID is added to the pure view subset for this filter, step 80. If the current view is a metric view, then the notifier looks for a matching metric in the matching filter set $S_f$, step 82. If no matching metric is found, the current metric is used to establish a new metric set for this filter, step 84, and the client ID is added to the new metric set m, step 86. If the same metric is found for the same filter, the client ID for the current view is added to that set, step 88. As a result, every client request or view is associated with a set, and all views are ordered in sets.

The notifier also keeps track of a number of different types of stream. So far only the streams used by clients, such as through event lists, have been described. There are also occasions where a client requires all the events in order rather than just the net change, e.g., a gateway, positioned e.g. between clients and the object server, performing historical recording of events. When the stream is requested by a client it can therefore also request that all state changes are recorded and sent out rather than just the net changes.

Streams may also be created with a store and forward (SAF) option. This allows events to be stored when a client looses connection with the object server. When the client reconnects, it is then sent all of the missing events. In this case disconnection of the client does not cause the stream to be deleted; instead it continues to output data but it is written to a file until the client reconnects. This type of stream is used by both gateways and between object servers in a cluster, as explained further below.

A client may also require data to be sent out as soon as it changes rather than have it cached and sent out at a later time. In this case, data is not cached; instead it is sent out immediately. This type of stream is used between object servers in a cluster, as explained further below.

When an event list user makes a change to a row within a displayed view, e.g., he deletes a row, then he expects to see the change appear in the event list on his screen and also in any associated views and metric views they have open. The notifier 30 therefore supports an option to flush a stream. The client 8 executes a SQL change to the database and waits for the SQL command complete acknowledge. It then sends a flush stream command to the notifier 30 specifying the view within which the change was made and the view's stream. The notifier 30 forces processing of all pending messages in the message queue to ensure that the SQL change is in the stream's cache and then sends out data on the stream and all associated view's streams. The change will then appear in the users views. Updating all other caches then continues as before but the flushed caches will not be updated again until the update time (since the flush) has expired. Turning now to FIG. 4, a desired frequency of metric view updates (in seconds), $f_0$, is used to regulate when the object server processes requests. If the time to process requests is reached, step 100, the first filter set in the set S is opened, step 102. The current position in the set S is represented by the pure view p, which represents each unique filter. The values of the metric(s) in the set S(p) are computed according to some function provided in the network management system, step 104. All clients registered to receive metrics are notified of the computed metric data, step 106. Next, pure view data is calculated, step 108, and registered clients for the pure view data are notified of the pure view data, step 110. The notifier then pauses for a given amount of time, e.g., t seconds, step 111, before proceeding to process the next set. If any sets remain in S, step 112, the next set S(p) is opened, step 114 and processed accordingly.

The amount of time used in a single sweep through S is measured, step 116. This may be done by clocking the actual time taken to process and distribute the requests, or may be based on predictions. If it exceeds a metric view threshold $t_m$, step 118, the time interval t between processing sets is incremented, e.g., by one second, step 120. This process of adjusting or throttling the time interval for notification helps limit processing requirements and prevent overloads.

Figure 5:
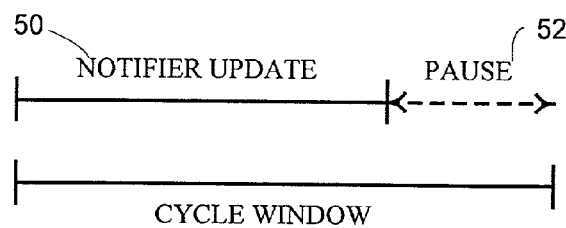
FIGS. 5 and 6 are timing diagrams illustrating the timing for distribution of the data ordered in the sets of view to requesting clients in accordance with one embodiment of the present invention.
Figure 6:
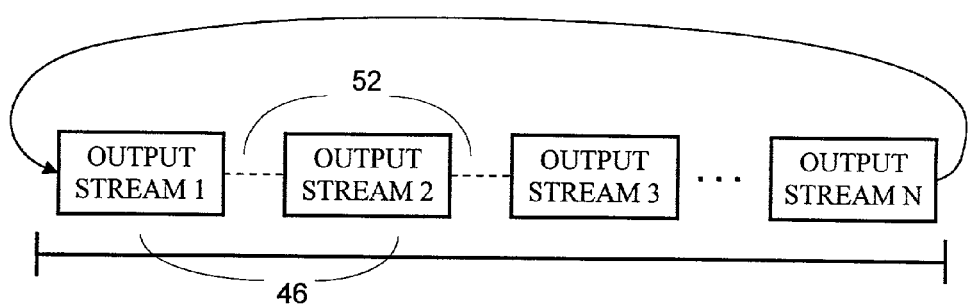

These timing issues are graphically illustrated in FIGS. 5 and 6. Per the timing diagram in FIG. 5, a processing cycle for the notifier consists of a time period 50 for updating clients from the output stream caches and a pause time 52 between such updates during which the notifier may perform other activities, such as updating sets of client views or updating the event database with new event data, and during which the object server may perform other activities. The amount of the pause time 52 as well as the whole window length can be altered as needed to accommodate overall network scalability.

FIG. 6 shows a timing diagram representing an entire cycle of updating all clients on updated event data relating to all sets of views. Barring atypical requests from clients or gateways for immediate or full sets of event data, the view sets are processed continuously in round robin fashion to provide the updated event data. Each such cycle consists of a period for processing an output stream 46 and a pause or free period 52 to allow other database processing. The length of the pause 52 may be incremented to accommodate additional processing needs as described above.

In accordance with additional aspects of the invention, object servers and their notifiers may be arranged in clusters to provide for backup of the object server. Each cluster consists of a master object server and one or more slave object servers. The slaves must be prepared to substitute themselves for the master in the event the master becomes temporarily or permanently unavailable. Similarly, the master must stay in sync with the slaves even during its own down time. These requirements apply not only to the event databases but also to the notifiers and view tables. Methods for keeping master and slave object servers and notifiers in sync are now described.

Figure 7:
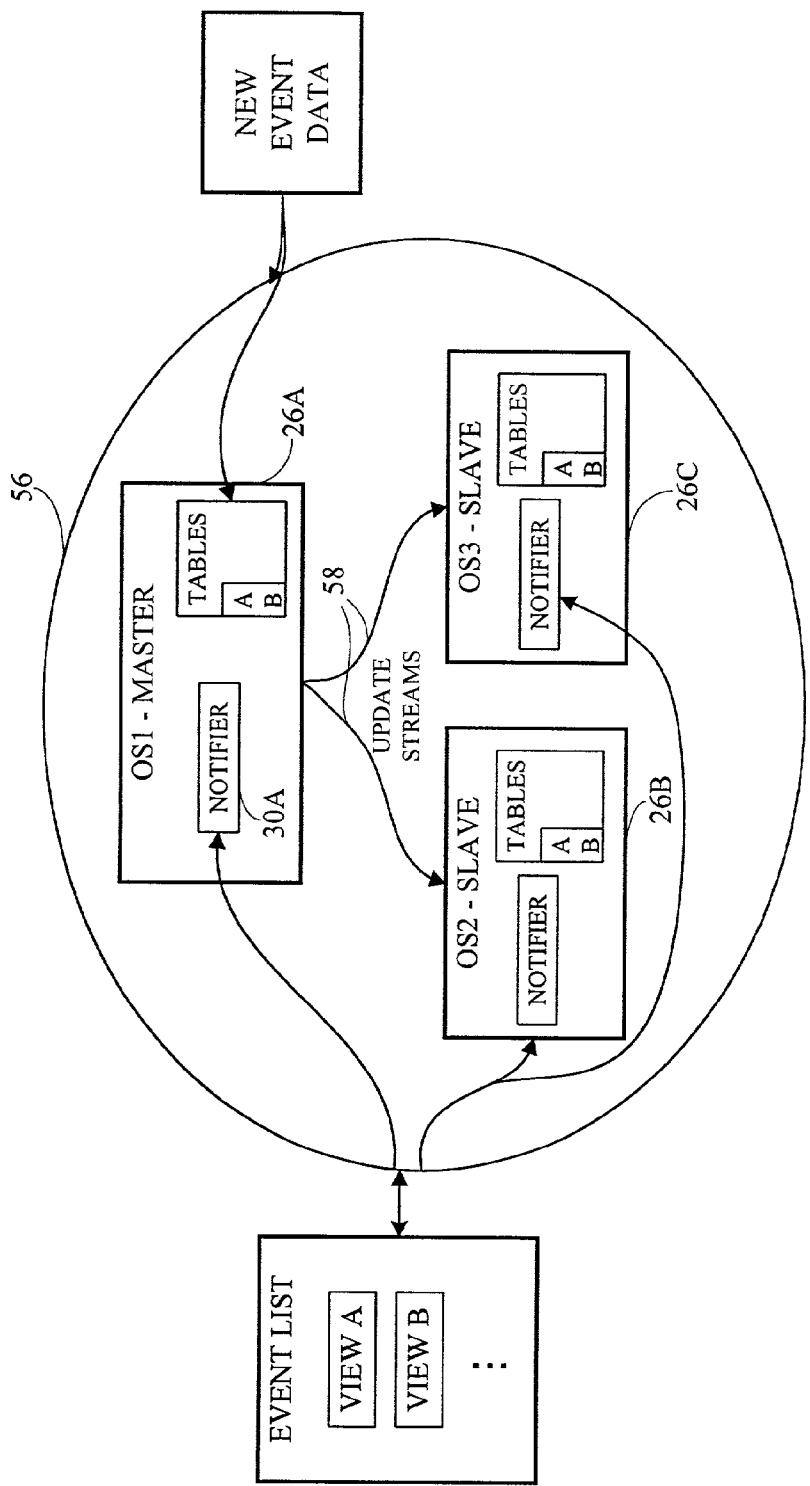
FIG. 7 is a block diagram of a distribution system as shown in FIG. 2 with multiple object servers arranged in a clustered configuration in accordance with one embodiment of the present invention.

An exemplary cluster is shown in FIG. 7. The cluster 56 contains one master object server 26A and two slave object servers 26B and 26C. A cluster has a unique name, e.g., NCOMS. One member of the cluster 56 is elected the master which then listens for messages addressed to the cluster's name as well as its own name, so that SQL commands from probes and desktops can be addressed to the cluster rather than to an individual node. Special kinds of tables, called cluster tables, are used to keep data coherent across the cluster: when a slave node is created, it is configured to have the same cluster tables as the master. Slave nodes 26B, 26C are notified of changes to the data held in cluster tables owned by the master using cluster streams 58.

When the master 26A fails or is taken offline, a quorum voting scheme is used to elect the new master, e.g., one of the two slaves 26B, 26C takes over as master provided that the two slaves are able to communicate between themselves (i.e. they are part of the majority). A node that is part of a minority (i.e. it cannot communicate with other nodes) is not a candidate for master since it cannot guarantee that a majority does not exist.

Considering the three object servers 26A, 26B, 26C, where 26A is the master. When 26A fails, 26B and 26C are informed of this. Both 26B and 26C now decide whether they will become master. A node makes this decision using its state and priority, e.g., if all slave nodes have active and current states, the node with the highest assigned priority becomes master. Assuming that 26B decides that it will become master, it publishes this request, and becomes the new master provided a majority vote is made.

The notifier 30A uses cluster tables to record all views, filters and all streams as they are created—in the order in which they are created. The client cluster code also records the client connection data in a cluster table in the same way. These cluster tables are replicated across the cluster as with any other cluster table. As client connections, views and filters are created and dropped on the master, the changes to the appropriate cluster tables are monitored by each slave. These are used to create or drop the same client connections, views and filters on the slaves. In this way the slaves stay in sync with the master.

When a stream subscription request comes in from a client it is read by all of the object servers in the cluster 56. The slaves finish creating any pending clients, views or filters and then check that they would then be able to create the stream. The stream is then created on the slave but not activated for output, and an acknowledgement is sent to the master. Once acknowledgements have been received by the master from all slaves in the current cluster and it has created the stream, it sends the stream (that the client must listen to) to the client. The output streams are also sent to the slave notifiers, which receive the processed event data as inputs to the slave output streams, which are not themselves distributed to clients as long as the master is in operation. If fail over occurs, e.g., the master crashes or otherwise becomes inaccessible or unable to process data normally, then one slave is elected as the new master. It then activates all of the streams and takes over updating them. Pending messages from probes, monitors, etc. are not processed until the notifier has activated all streams and resumed notification.

When a gateway uses a SAF stream it requires full historical data. If the gateway goes down, SAF buffers up the data being transmitted at the object server until the gateway comes back again. The data is buffered to disk so that if the master also goes down then, when it comes back up again, the data can still be retransmitted. However, in a cluster this would mean a slave would take over transmitting and therefore buffering the historical data to the gateway. When the original master comes back up again sometime later and transmits its buffered data, this would result in mis-ordered data being sent to the gateway.

To solve this problem, a count is added to each row of gateway data. The master sends out this sequence count to the gateway and to the slaves, which also listen on the same subscribed stream. This allows the slaves to record the sequence count, as it is incremented. If fail over occurs and a slave takes over notification it continues the count from the last output value. When a gateway comes back up again and gets sent the SAF data from the current master and the old master (when it comes back up again), it can then use the sequence count to order the data correctly.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A computer implemented method for preparing to distribute data to be extracted from a data store to a plurality of clients, the method comprising:

storing in a table as primary requests one or more client requests for periodic updates of data to be extracted from the data store according to one or more first filters;

for an additional client request for periodic updates of data to be extracted from the data store according to one or more second filters, comparing the additional client request to the primary requests stored in the table to determine whether the one or more second filters in the additional client request matches the one or more first filters of one of the stored primary requests;

if the one or more second filters of the additional client request matches the one or more first filters of a particular stored primary request, storing data identifying the additional client request in the table as a secondary request associated with the particular stored primary request; and if the one or more second filters of the additional client request does not match the one or more first filters of any of the stored primary requests, storing the additional client request in the table as an additional primary request, periodically extracting data updates from the data store in accordance with the one or more first filters in a stored primary request; and distributing the extracted data updates to the stored primary request and an associated secondary request.

2. The method of claim 1, wherein the stored primary requests and the additional client request each comprise a request for summary data comprising data to be extracted from the data store and processed in accordance with a metric.

3. The method of claim 2, wherein comparing the additional request to the stored primary requests comprises comparing the metric of the additional request to the metric of the stored primary request.

4. The method of claim 1, wherein the data store comprises event data relating to events occurring on a network.

5. The method of claim 1, wherein the stored primary requests are received from first clients and the additional client request is received from a second client different than the first clients.

6. The method of claim 1, comprising storing in the table a set of client requests received from a plurality of clients, the set comprising a primary client request for periodic updates of data to be extracted from the data store according to one or more first filters to a first client in association with one or more secondary client requests for periodic updates of data to be extracted from the data store according to one or more second filters to one or more second clients different than the first client, the secondary client requests each having one or more second filters for performing the periodic updates matching one or more first filters for performing the periodic updates contained in the primary client request;
    periodically extracting data updates from the data store in accordance with the one or more first filters in the primary client request; and
    distributing the extracted data updates to the first client and to the one or more second clients.

7. The method of claim 6, comprising storing a plurality of sets of client requests, each set comprising a primary client request for periodic updates of data in association with one or more secondary client requests, the secondary client requests each having one or more second filters that match the one or more first filters of a respective primary client request.

8. The method of claim 7, comprising performing the steps of extracting and distributing data for each of the plurality of sets of client requests.

9. The method of claim 8, comprising pausing a first time interval between extracting and distributing each of the plurality of sets of client requests.

10. The method of claim 9, comprising determining a length of time required to extract and distribute data to all first and second clients and, if the determined time length exceeds a threshold, increasing the first time interval.

11. The method of claim 6, wherein the primary and secondary client requests each comprise the filters for extracting a subset of data from the data store, and wherein storing the set comprises identifying the set through the filters.

12. The method of claim 6, wherein at least one of the client requests in the set comprise a metric for summarizing data extracted from the data store, comprising summarizing the extracted data using the metric and distributing the summarized data to any first or second client whose client request comprises the metric.

13. A system for distribution of network event data, the system comprising:
    a data store containing data relating to events occurring on the network;
    a library for storing as primary requests one or more client requests for periodic updates of data to be extracted from the data store according to one or more first filters;
    for an additional client request for periodic updates of data to be extracted from the data store according to one or more second filters, comparing the additional client request to the primary requests stored in the table to determine whether the one or more second filters in the additional client request matches the one or more first filters of one of the stored primary requests;
    if the one or more second filters of the additional client request matches the one or more first filters of a particular stored primary request, storing data identifying the additional client request in the table as a secondary request associated with the particular stored primary request; and
    if the one or more second filters of the additional client request does not match the one or more first filters of any of the stored primary requests, storing the additional client request in the table as an additional primary request,
    periodically extracting data updates from the data store in accordance with the one or more first filters in a stored primary request; and
    a notification system for distributing the extracted data updates to the stored primary request and an associated secondary request.

14. The system of claim 13, wherein the notification system comprises a notifier program running a plurality of program threads.

15. The system of claim 13, comprising a plurality of data stores arranged in a cluster, wherein one data store comprises a master data store and one or more other data stores comprise slave data stores.

16. The system of claim 15, comprising means for synchronizing the network event data stored in the data stores between the master and slave data stores.

17. The system of claim 16, comprising a slave client request library associated with each slave data store and means for synchronizing the library for the master data store with the slave client request libraries.

18. The system of claim 17, comprising a slave notification system associated with each slave data store for, in the event of failure of the master data store or notification system, distributing to the plurality of clients data extracted from the slave data store in accordance with the one or more sets of client requests stored in the slave library.

19. The system of claim 18, wherein the master notification system distributes data extracted from the master data store to the one or more slave notification systems.

20. The system of claim 18, comprising means for maintaining an order of distributed data delivered to a first client to thereby enable the first client to properly order the distributed data in the event of a temporary failure of the first client.

21. The system of claim 20, wherein the first client is a gateway between a second client and the slave notification system.

22. The system of claim 20, wherein the means for maintaining the order comprises a sequence count inserted in the distributed data by the master and slave notification systems.

* * * * *